United States Patent [19]

McCracken et al.

[11] Patent Number: 4,933,429
[45] Date of Patent: Jun. 12, 1990

[54] METHOD FOR PREPARING POLYESTER-POLYEPOXIDE COMPOSITIONS OF HIGH MELT VISCOSITY

[75] Inventors: Linda L. McCracken, Clifton Park, N.Y.; Kelvin T. Okamoto, Evansville, Ind.; Choong Y. Han, Pittsfield, Mass.; Sterling B. Brown, Schenectady, N.Y.; Michael G. Minnick, Coshocton, Ohio

[73] Assignee: General Electric Company, Schenectady, N.Y.

[21] Appl. No.: 322,471

[22] Filed: Mar. 13, 1989

[51] Int. Cl.$^5$ ............................................. C08G 63/02
[52] U.S. Cl. ..................... 528/272; 528/275; 528/286; 528/288; 528/289; 528/291; 528/308.1; 528/308.3; 525/438; 525/440; 524/174; 524/186; 524/401
[58] Field of Search ............... 528/272, 275, 286, 288, 528/289, 291, 308.1, 308.3; 525/438, 440; 524/174, 186, 401

[56] References Cited

U.S. PATENT DOCUMENTS 4,101,601  7/1978  Thomas ............................... 525/428

FOREIGN PATENT DOCUMENTS 7596648  7/1975  Japan .

Primary Examiner—John Kight, III
Assistant Examiner—Sam A. Acquah
Attorney, Agent, or Firm—William H. Pittman; James C. Davis, Jr.

[57] ABSTRACT

Polyesters, especially poly(ethylene terephthalate) and poly(butylene terephthalate), having a substantial proportion of free carboxylic acid groups are caused to react with polyepoxy compounds, especially poly(O- or N-epoxyalkyl-substituted) cyclic amides, imides and amidates and preferably triglycidyl isocyanurate, in the presence of various amines or salts as catalysts. The preferred catalysts are fatty acid salts such as sodium sterate. The products have very high melt viscosities and are useful in such operations as blow molding.

20 Claims, No Drawings

METHOD FOR PREPARING POLYESTER-POLYEPOXIDE COMPOSITIONS OF HIGH MELT VISCOSITY

This invention relates to the preparation of branched polyesters, and more particularly to a method for their preparation from a thermoplastic polyester and a polyepoxy compound.

Linear polyesters, exemplified by poly(ethylene terephthalate) and poly(butylene terephthalate) (hereinafter "PET" and "PBT", respectively), are in wide industrial use for the preparation of articles by such forming methods as injection molding. Many of their properties, including chemical stability, solvent resistance and low permeability to gas, make them attractive candidates for such forming operations as blow molding, profile extrusion and thermoforming. One problem in such operations is the relatively low melt viscosities of the polyesters, as a result of which the formed articles do not adequately retain their shape immediately after forming and before they have cooled.

In recent years, methods have been developed for increasing the melt viscosities and melt strengths of such polyesters. For example, Japanese Kokai 75/96648 and Japanese Kokai 81/116749 describe the reaction of various thermoplastic polyesters with triglycidyl isocyanurate (hereinafter "TGIC"). In this reaction, a branched polyester is apparently formed by reaction of carboxylic acid end groups of the polyester with each of the epoxy groups. By reason of this branching, the polyester displays low viscosity at high shear rates, as during extrusion, and high viscosity and melt elasticity at low shear rates, as during hanging of a blow-molded parison, which ensures dimensional stability.

Still more recently, improved methods for conducting this reaction have been developed. For example, application Ser. No. 184,534, filed Apr. 21, 1988, describes the initial preparation of a reactive concentrate by the reaction of a relatively large amount of the polyepoxide with a linear polyester having a measurable proportion of free carboxylic acid end groups. The reactive concentrate is then melt blended with further linear polyester to form the desired branched polyester product. A somewhat different method, employing a concentrate in which the polymer is non-reactive with the polyepoxide, is the subject of application Ser. No. 125,859, filed Nov. 27, 1987. Both applications are copending and commonly owned herewith.

It has now been found that products with still better viscosity properties, including even higher melt viscosities than those obtainable by the method described in the above-referenced documents, can be obtained by employing various materials as catalysts in the reaction of the polyepoxide with the thermoplastic polyester. Certain of these catalysts also have other beneficial effects, such as permitting an increase in feed rate during blending by extrusion and reducing the level of acrolein generated as an impurity when TGIC is the polyepoxide employed.

In one of its aspects, therefore, the present invention is a method for preparing a branched polymer which comprises effecting reaction between (A) at least one thermoplastic polyester having a substantial proportion of free carboxylic acid groups and (B) at least one polyepoxy compound in the presence of (C) at least one catalyst compound selected from the group consisting of (1) primary alkylamines in which the alkyl group contains at least about 8 carbon atoms and (2) salts free from direct carbon-phosphorus bonds and containing at least one of alkali and alkaline earth metal cations and halide anions; said catalyst being employed in an amount effective to afford a product having a higher melt viscosity than that of a corresponding product from reagents A and B alone. Another aspect of the invention is compositions comprising reagents A and B and any reaction products thereof and a catalytically effective amount of reagent C.

U.S. Pat. No. 4,101,601 describes the preparation of branched polyesters of high melt viscosity by reaction of a thermoplastic polyester with a polyepoxide in the presence of a catalyst selected from a limited class of phosphonium halides. The catalysts employed according to the present invention are not phosphonium halides, and many of them are substantially cheaper and more readily available than phosphonium halides. Moreover, certain of the compounds used as catalysts according to this invention have beneficial properties beyond increasing melt viscosity, which properties could in no way have been expected from U.S. Pat. No. 4,101,601.

The polyesters useful as reagent A in the method of this invention typically comprise structural units of the formula

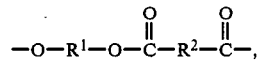

wherein each $R^1$ is independently a divalent aliphatic, alicyclic or aromatic radical containing about 2–10 carbon atoms and each $R^2$ is independently a divalent aliphatic, alicyclic or aromatic radical containing about 2–10 and usually about 6–10 carbon atoms. Polyesters containing such units may be prepared by the known reaction of dihydroxy compounds with dicarboxylic acids or functional derivatives thereof such as anhydrides, acid chlorides or lower alkyl (especially methyl) esters, preferably the esters.

The $R^1$ radicals may be one or more aliphatic or alicyclic hydrocarbon radicals containing about 2–10 carbon atoms, alicyclic radicals being known to those skilled in the art to be equivalent to aliphatic radicals for the purposes of the invention. They are most often derived from aliphatic or alicyclic dihydroxy compounds such as ethylene glycol, 1,4-butanediol, propylene glycol, 1,3-propanediol, 1,6-hexanediol, 1,10-decanediol, 1,4-cyclohexanedimethanol and 2-butene-1,4-diol. Aromatic dihydroxy compounds, especially bisphenols such as bisphenol A, may also be employed. The $R^1$ radicals may also contain substituents which do not substantially alter the reactivity of the dihydroxy compound (e.g., alkoxy, halo, nitrile) or hetero atoms (e.g., oxygen or sulfur). The aliphatic and alicyclic $R^1$ radicals are usually saturated.

The $R^2$ radicals may be derived from such acids as succinic, adipic, maleic, isophthalic and terephthalic acids or similar substituted and hetero atom-containing acids.

Also contemplated are polymers in which at least a portion of the $R^1$ and/or $R^2$ values are soft segment radicals such as poly(oxyethylene) or poly(oxybutylene). Such polymers may be prepared by incorporating compounds such as polyethylene glycol, caprolactone or dicarboxylic acids containing polyoxyalkylene segments in the polymerization reaction, and are typically elastomeric. Illustrative polyesters of this type are available from DuPont and General Electric under the trade names HYTREL and LOMOD, respectively.

Preferably, $R^1$ and $R^2$ are hydrocarbon radicals, typically containing about 2–10 and preferably 2–6 carbon atoms. Most often, $R^1$ is aliphatic and $R^2$ is aromatic. The polymer is most desirably a poly(alkylene terephthalate), particularly PET or PBT and especially the latter. It usually has a number average molecular weight of at least about 4000, preferably in the range of about 10,000–70,000, as determined by gel permeation chromatography or by intrinsic viscosity (IV) at 30° C. in a mixture of 60% (by weight) phenol and 40% 1,1,2,2-tetrachloroethane.

For the purposes of this invention, it is essential that the polyester have a measurable proportion of free carboxylic acid groups, as determined by titration. These will usually be end groups, and their concentration is conventionally measured as microequivalents per gram.

For the most part, a carboxylic acid group concentration in the range of about 5–250 microequivalents per gram is suitable. Polyesters may degrade to some extent on extrusion, increasing the concentration of such end groups which is available for reaction. It is, however, often preferred to employ polyesters having a carboxylic acid end group concentration in the range of about 10–100, especially about 30–100 and preferably about 40–80 microequivalents per gram.

Reagent B is at least one polyepoxy compound. Many types of polyepoxy compounds are known in the art and any of them are capable of use in the present invention. They include bisphenol diglycidyl ethers, epoxy novolaks, glycidyl adducts of amines and amides, glycidyl adducts of carboxylic acids, polymers of unsaturated epoxides and compounds prepared by epoxidation of dienes or polyenes. The preferred polyepoxy compounds are poly(O- or N-epoxyalkyl-substituted) cyclic amides, imides and imidates, usually containing one non-epoxy cyclic moiety although compounds with linked or fused moieties are also contemplated.

Most often, reagent B is a compound in which the epoxyalkyl groups are bonded directly to the oxygen or nitrogen atoms; however, compounds containing intervening structure, such as 2-carboglycidyloxyethyl compounds, may also be used. The presence of more than one epoxy group per molecule is essential. At least three of such groups are highly preferred, with three and only three being especially preferred, by reason of the ease of preparation therefrom of branched polyesters with a minimum of crosslinking and resulting gel formation.

Illustrative cyclic nuclei which may be present in reagent B are the triazine, barbiturate, hydantoin, uracil, pyromellitic diimide, piperazinedione and parabanate ring system. As previously noted, the epoxy-containing functionalities may be present as substituents on oxygen or nitrogen atoms therein, with nitrogen atoms frequently being preferred. The most suitable compounds are triazine derivatives, including triglycidyl cyanurate and TGIC. TGIC is particularly preferred by reason of its availability and particular suitability for the formation of branched polyesters. It has the formula

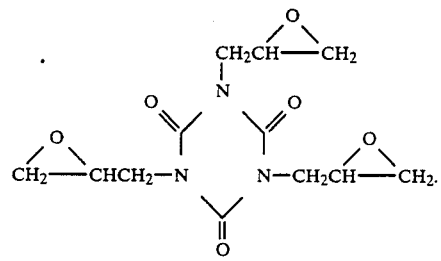

The essential feature of the present invention is the employment of a catalyst (reagent C) for the polyester-polyepoxy compound reaction. Suitable catalysts are in two classes, the first of which consists of primary alkylamines in which the alkyl group contains at least about 8 and preferably about 10–20 carbon atoms. Illustrative amines of this type include octylamine, decylamine, dodecylamine, tetradecylamine, pentadecylamine and eicosylamine. Included is the use of mixtures containing such amines, certain of which are commercially available as accelerators for crosslinking of polyepoxy compounds. For example, the mixture of a long chain amine, a long chain quaternary ammonium salt and stannous octoate in a polymeric medium sold by Ciba-Geigy under the designation "XB3126" is suitable for use as a catalyst.

The second class of catalytic compounds consists of salts free from direct carbon-phosphorus bonds and containing at least one of alkali and alkaline earth metal cations and halide anions. It is apparent that this class contains a large number of compounds. They include alkali metal halides, alkali metal carboxylates, alkali metal enolates, amine hydrohalides and quaternary ammonium halides. Illustrative compounds within this class are lithium fluoride, lithium iodide, potassium bromide, sodium dihydrogen phosphate, sodium acetate, sodium benzoate, sodium caproate, sodium stearate, sodium ascorbate and dodecyltrimethylammonium bromide.

At high temperatures, as under melt conditions, thermoplastic polyesters undergo hydrolysis and molecular weight degradation by traces of water. Therefore, it is highly preferred for the catalyst to be free from substantial quantities of water. In general, water proportions greater than those present in a monohydrate of the catalyst should be avoided. It is generally advisable to employ anhydrous and/or non-hygroscopic salts as catalysts.

Salts of aliphatic carboxylic acids containing at least about 10 carbon atoms, especially the alkali metal stearates and preferably sodium stearate, have certain advantages over the other catalysts employed according to the invention and are therefore often preferred. In the first place, their use permits extrusion of the polyester-polyepoxide composition at substantially higher feed rates than those which are effective in their absence. In the second place, they tend to suppress the formation of acrolein, a by-product from glycidyl reagents such as TGIC. In the third place, they impart substantially less odor to the composition than certain other compounds useful as catalysts, especially amines.

The proportion of polyepoxy compound employed according to the present invention is generally about 0.05–3.0 parts by weight per 100 parts of polyester. The catalyst is employed in an amount effective to afford a product having a higher melt viscosity than is the case in its absence; said amount can be determined by simple experimentation. In general, about 0.01–0.5 part per 100 parts of polyester is operative. For alkali metal stearates, about 0.01–0.10 part is preferred.

The invention requires effecting reaction between the polyester and polyepoxy compound in the presence of the catalyst. Conventional blending methods may be used to effect said reaction. Melt blending methods are typically employed, frequently preceded by a dry blending step. A melt blending operation which is often preferred is extrusion, ordinarily at temperatures in the range of about 200–300° C.

TGIC and similar compounds are typically supplied as powders which may agglomerate into course particles. These particles are frequently difficult to mix uniformly with the other components during extrusion, and may result in regions of gel formation which produce flaw sites in formed articles. Moreover, many such compounds are irritants and/or health hazards. For example, TGIC may have mutagenic properties. Contact with the body and inhalation should therefore be avoided as much as possible.

For this reason, it is frequently preferred to initially prepare a concentrate by blending a relatively large amount of the polyepoxide with the polyester. Concentrates of this type may be prepared by melt blending or solution blending techniques as appropriate, and typically contain about 3–20 parts by weight of polyepoxide per 100 parts of polyester.

The concentrates thus prepared are essentially indistinguishable in appearance and physical behavior from the resin used for their preparation. No obvious indicia of phase separation are observed therein. The concentrate is dust-free and may be handled with minimum skin contact with and inhalation of the polyepoxide. It may be readily pelletized for easy handling. By the preparation of (for example) one batch of such a concentrate, continued or repeated handling of polyepoxide is made unnecessary. Reference is again made to the aforementioned copending applications Serial Nos. 125,859 and 184,534 for further details of the preparation of branched polyester compositions via concentrates.

When such concentrates are employed, the catalyst may be incorporated in the mixture at the time of preparation of the concentrate and/or when the concentrate is subsequently blended with further polyester. Subsequent blending of catalyst is often especially preferred.

The method of this invention is illustrated by the following examples. All parts are by weight.

EXAMPLE 1

A PBT having a number average molecular weight (as determined by gel permeation chromatography) of about 50,000 and a carboxylic acid end group concentration of about 45 meq./g. was dried for 4 hours at 120° C. in a circulating air oven. One hundred parts of the PBT was blended with 3.5 parts of TGIC and the mixture was extruded on a 20-mm. twin screw extruder at 400 rpm. and 266° C. The extrudate was quenched in water, pelletized and redried. A sample of the reactive concentrate thus produced was found by analysis to correspond to a TGIC charge of 3.0%, the variation from the charged amount being attributable to such factors as non-homogeneous blending and settling.

Portions of the reactive concentrate were dry blended with further PBT and various catalysts and the blends were mixed on a roller mill for at least 30 minutes and extruded on a 20-mm. twin screw extruder at 400 rpm. and 240° or 265° C., and a feed rate of 78 grams per minute. The extrudates were cooled, pelletized and dried in vacuum at 110° C. for 4 hours. Melt viscosities were then determined, using a Tinius-Olsen melt flow indexer at 250° C. The results are given in Table I, in comparison with controls prepared and tested at the same time but containing no catalyst.

TABLE I

| | Percent by wt. | | Extruder temp. °C. | Melt viscosity | |
|---|---|---|---|---|---|
| Catalyst | TGIC | Catalyst | | Value kilopoises | % increase over control |
| Control 1 | 0.43 | 0 | 510 | 96 | — |
| Potassium bromide | 0.43 | 0.1 | 510 | 120 | 25 |
| Lithium iodide | 0.43 | 0.1 | 510 | 147 | 53 |
| Lithium fluoride | 0.43 | 0.1 | 510 | 152 | 58 |
| Dodecyltrimethylammonium bromide | 0.43 | 0.1 | 510 | 313 | 230 |
| Dodecylamine | 0.43 | 0.1 | 510 | 336 | 250 |
| Sodium benzoate | 0.43 | 0.1 | 510 | 170 | 77 |
| Sodium ascorbate | 0.43 | 0.1 | 510 | 128 | 33 |
| Control 2 | 0.21 | 0 | 465 | 29 | — |
| sodium dihydrogen phosphate | 0.21 | 0.3 | 465 | 51 | 76 |
| Sodium acetate | 0.21 | 0.1 | 465 | 59 | 100 |
| Sodium caproate | 0.21 | 0.1 | 465 | 74 | 160 |
| Sodium stearate | 0.21 | 0.05 | 465 | 144 | 400 |
| " | 0.21 | 0.02 | 465 | 35 | 21 |
| Control 3 | 0.43 | 0 | 510 | 40 | — |
| "XB 3126" | 0.43 | 0.1 | 510 | 62 | 55 |

EXAMPLE 2

Following the procedure of Example 1, a reactive concentrate was prepared from 100 parts of PBT and 3.4 parts of TGIC and was blended with additional PBT and sodium stearate to a TGIC level of 0.15% and a sodium stearate level of 0.05%. During extrusion on a 53-mm. single screw extruder, acrolein fume monitoring was performed according to OSHA procedures. The time-weighted average of the detected acrolein level over 8 hours was 0.05 ppm., as compared to 0.17 ppm. for a control sample not containing the sodium stearate. The threshold limit value is 0.10 ppm. The feed rate of 91 kg./hr. for the control could be increased to 136 kg./hr. by the addition of sodium stearate.

EXAMPLE 3

Mixtures were prepared from 97.4 parts of poly(ethylene terephthalate) bottle scrap, 1.5 parts of various polyepoxides, 1 part of silica as a processing aid and 0.1 part of sodium stearate. These mixtures were extruded and melt viscosities were determined at 266° C. on a Tinius-Olsen Plastometer (5-minute dwell time) and a Monsanto Capillary Rheometer (5- and 10-minute dwell times), in comparison with a control in which the sodium stearate was omitted and the polyester was increased proportionally. The results are given in Table II.

TABLE II

| Polyepoxide: | | | | |
|---|---|---|---|---|
| Epoxy novolak | X (control) | X | — | — |
| Bisphenol A polyglycidyl ether | — | — | X | — |
| Tris (4-glycidoxyphenyl) methane | — | — | — | X |
| Tinius-Olsen melt visc., poises | 2010 | 7050 | 2270 | 8370 |
| Monsanto Rheometer melt visc., poises: | | | | |

TABLE II-continued

| | | | | |
|---|---|---|---|---|
| 5 min. | 1420 | 3000 | 1520 | 2630 |
| 10 min. | 1340 | 4820 | 1550 | 3270 |

What is claimed is:

1. A method for preparing a branched polymer which comprises effecting reaction between (A) at least one thermoplastic polyester having a substantial proportion of free carboxylic acid groups and (B) at least one polyepoxy compound in the presence of (C) at least one catalyst compound selected from the group consisting of (1) primary alkylamines in which the alkyl group contains at least about 8 carbon atoms and (2) salts free from direct carbon-phosphorus bonds and containing at least one of alkali and alkaline earth metal cations and halide anions; said catalyst being employed in an amount effective to afford a product having a higher melt viscosity than that of a corresponding product from reagents A and B alone.

2. A method according to claim 1 wherein the polepoxy compound is a poly(O- or N-epoxyalkyl-substituted) cyclic amide, imide or imidate and the polyester comprises the structural units of the formula

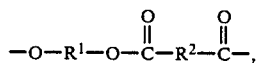

wherein each $R^1$ is independently a divalent aliphatic, alicyclic or aromatic radical containing about 2-10 carbon atoms and each $R^2$ is independently a divalent aliphatic, alicyclic or aromatic radical containing about 2-10 carbon atoms.

3. A method according to claim 2 wherein the polyepoxy compound contains a single triazine, barbiturate, hydantoin, uracil, pyromellitic diimide, piperazinedione or parabanate moiety and the epoxyalkyl groups therein are bonded directly to oxygen or nitrogen atoms.

4. A method according to claim 3 wherein the polyepoxy compound is triglycidyl isocyanurate and the polyester is a poly(ethylene terephthalate) or a poly(butylene terephthalate) having a carboxylic acid end group concentration in the range of about 10-100 microequivalents per gram.

5. A method according to claim 4 wherein about 0.05-3.0 parts by weight of polyepoxy compound and about 0.01-0.5 part by weight of catalyst is employed per 100 parts of polyester.

6. A method according to claim 5 wherein the catalyst comprises a primary alkylamine containing about 10-20 carbon atoms.

7. A method according to claim 5 wherein the catalyst is potassium bromide, lithium iodide, lithium fluoride, sodium acetate, sodium caproate, sodium benzoate, sodium ascorbate, sodium dihydrogen phosphate or dodecyltrimethylammonium bromide.

8. A method according to claim 4 wherein the catalyst is an alkali metal salt of an aliphatic carboxylic acid containing at least about 10 carbon atoms.

9. A method according to claim 8 wherein about 0.1-3.0 parts by weight of polyepoxy compound and about 0.01-0.10 part by weight of catalyst is employed per 100 parts of polyester.

10. A method according to claim 9 wherein the catalyst is sodium stearate.

11. A composition comprising (A) at least one thermoplastic polyester having a substantial proportion of free carboxylic acid groups, (B) at least one poly(O- or N-epoxyalkyl-substituted) cyclic amide, imide or imidate, and any reaction products thereof, and (C) a catalytically effective amount to increase melt viscosity of at least one compound selected from the group consisting of (1) primary alkylamines in which the alkyl group contains at least about 8 carbon atoms and (2) salts free from direct carbon-phosphorous bonds and containing at least one of alkali and alkaline earth metal cations and halide anions.

12. A composition according to claim 1 wherein the polyesters comprises structural units of the formula

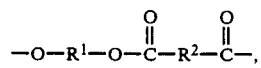

wherein each $R^1$ is independently a divalent alipahtic, alicyclic or aromatic radical containing about 2-10 carbon atoms and each $R^2$ is independently a divalent aliphatic, alicyclic or aromatic radical containing about 2-10 carbon atoms.

13. A composition according to claim 12 wherein the polyepoxy compound contains a single triazine, barbiturate, hydantoin, uracil, pyromellitic diimide, piperazinedione or parabanate moiety and the epoxyalkyl groups therein are bonded directly to oxygen or nitrogen atoms.

14. A composition according to claim 13 wherein the polyepoxy compound is triglycidyl isocyanurate and the polyester is a poly(ethylene terephthalate) or a poly(butylene terephthalate) having a carboxylic acid end group concentration in the range of about 10-100 microequivalents per gram.

15. A composition according to claim 14 wherein about 0.05-3.0 parts by weight of polyepoxy compound and about 0.01-0.10 part by weight of catalyst is employed per 100 parts of polyester.

16. A composition according to claim 15 wherein the catalyst comprises a primary alkylamine containing about 10-20 carbon atoms.

17. A composition according to claim 15 wherein the catalyst is potassium bromide, lithium iodide, lithium fluoride, sodium acetate, sodium caproate, sodium benzoate, sodium ascorbate, sodium dihydrogen phosphate or dodecyltrimethylammonium bromide.

18. A composition according to claim 14 wherein the catalyst is an alkali metal salt of an aliphatic carboxylic acid containing at least about 10 carbon atoms.

19. A composition according to claim 18 wherein about 0.05-3.0 parts by weight of polyepoxy compound and about 0.01-0.10 part by weight of catalyst is employed per 100 parts of polyester.

20. A composition according to claim 19 wherein the catalyst is sodium stearate.

* * * * *

UNITED STATES PATENT AND TRADEMARK OFFICE
CERTIFICATE OF CORRECTION

PATENT NO. : 4,933,429

DATED : June 12, 1990

INVENTOR(S) : Linda L. McCracken et al.

It is certified that error appears in the above-identified patent and that said Letters Patent is hereby corrected as shown below:

Title page, remove the name of Michael G. Minnick, Coshocton, Ohio, as a joint inventor.

Signed and Sealed this

Sixth Day of August, 1991

*Attest:*

HARRY F. MANBECK, JR.

*Attesting Officer*     *Commissioner of Patents and Trademarks*